Nov. 17, 1964

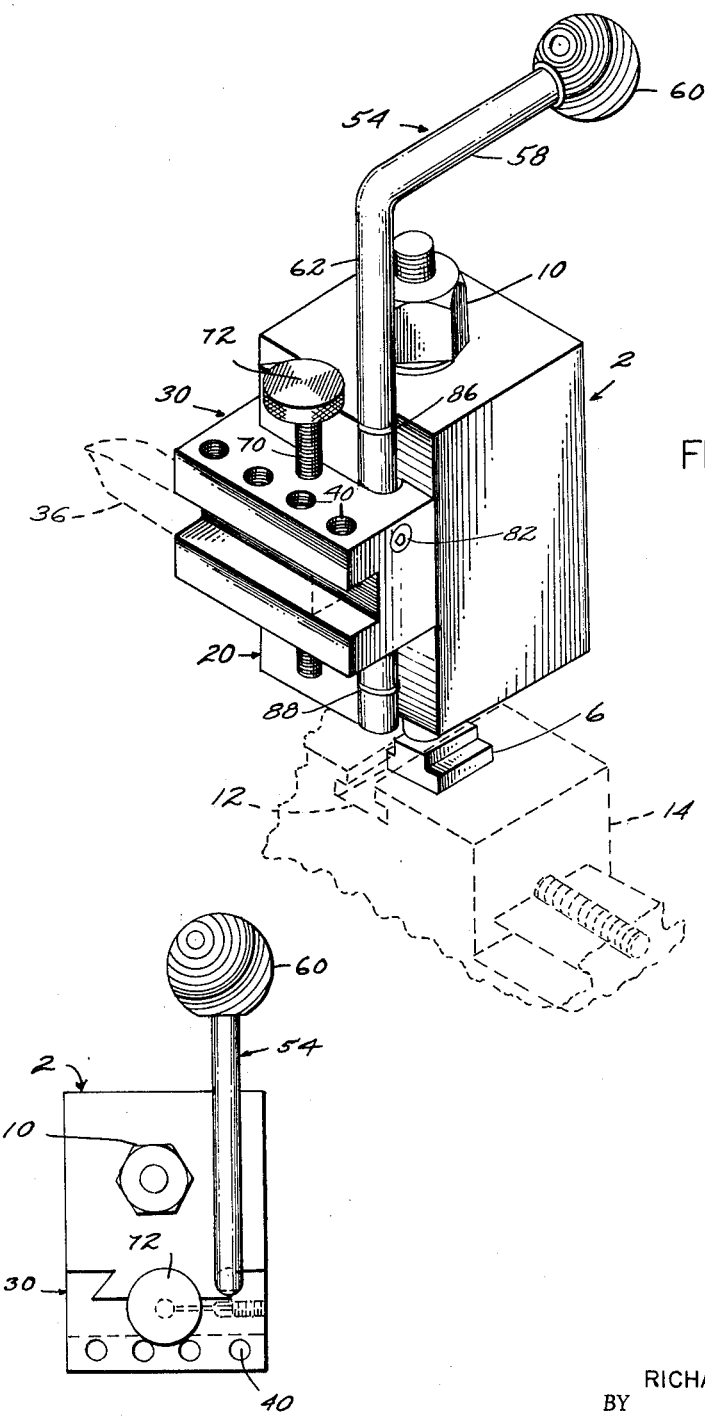

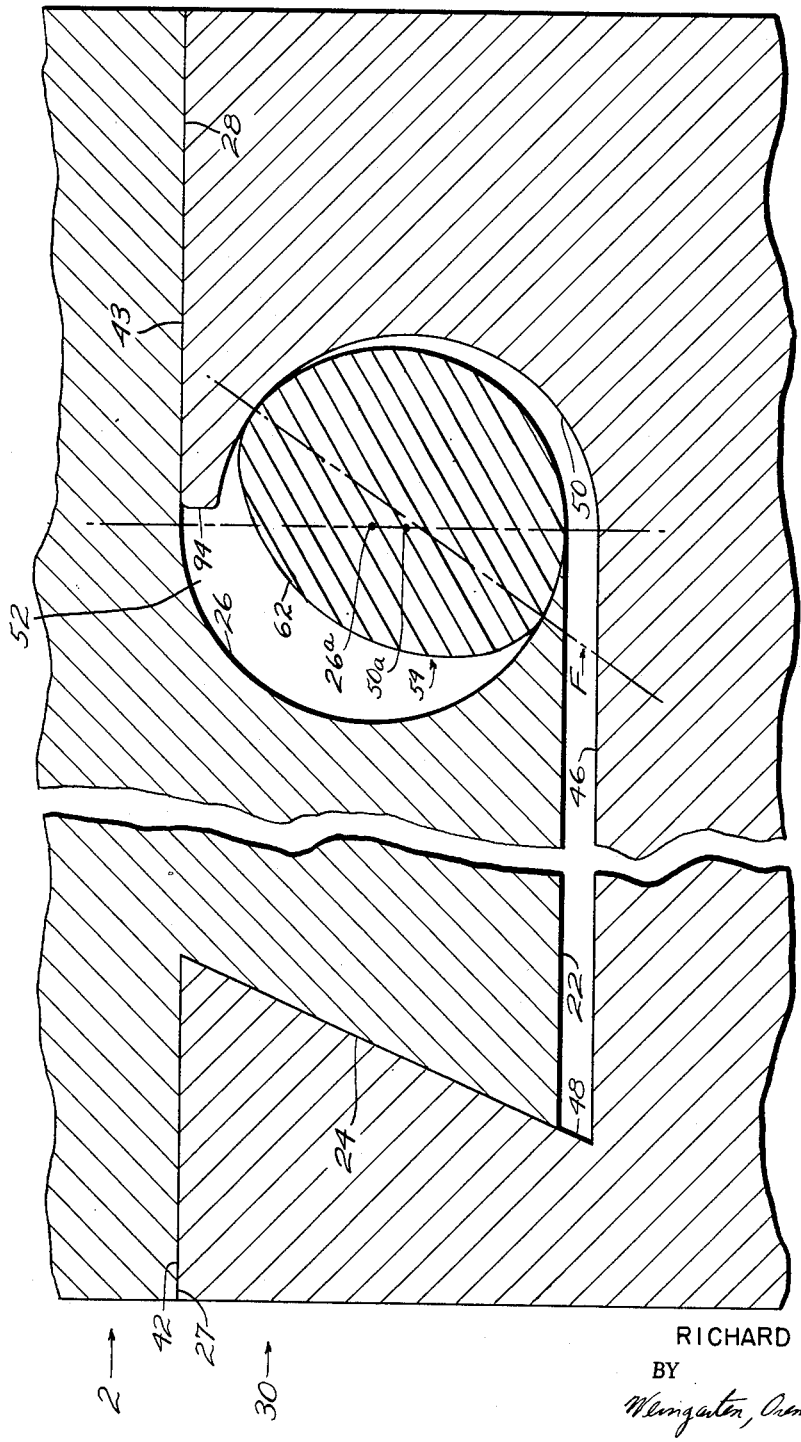

R. J. POWERS 3,157,078

TOOL BLOCK

Filed Dec. 12, 1961

INVENTOR.
RICHARD J. POWERS
BY

ATTORNEYS

United States Patent Office 3,157,078
Patented Nov. 17, 1964

3,157,078
TOOL BLOCK
Richard J. Powers, 26 Cadish Ave., Hull, Mass.
Filed Dec. 12, 1961, Ser. No. 158,722
7 Claims. (Cl. 82—36)

This invention relates to machine tools and more particularly to a tool block for lathes, screw machines, and the like.

The primary object of the present invention is to provide a tool block for lathes, screw machines, and the like which permits a tool to be adjusted for height easily, quickly, and accurately and which includes quick-acting means for locking the tool in a selected position.

A more specific object of the present invention is to provide a tool block which comprises a base adapted to be mounted on the cross slide of a lathe or the tool mount of an automatic screw machine, a tool holder which mates with the base and is adapted to hold a cutting tool, and means interposed between the base and the tool holder for locking the tool holder at a selected height, the interposed means being movable from a first position wherein the tool holder is free to move vertically relative to the base and a second position wherein the tool holder is locked firmly against any movement relative to the base. It is also contemplated that an adjustable stop member may be employed to allow the tool holder to automatically assume a preselected height when it is slipped onto the base.

Other objects and many of the attendant advantages of the present invention will become more readily apparent as reference is had to the following detailed specification which is to be considered together with the accompanying drawings wherein:

FIG. 1 is a perspective view of a preferred form of tool block constructed according to the present invention;

FIG. 2 is a plan view of the unit of FIG. 1;

FIG. 3 is a fragmentary plan sectional view on an enlarged scale of a portion of the unit of FIG. 1, showing the cross-sectional configuration of the lock rod and the configuration of the surfaces of the base and tool holder which it engages.

Figure 4:
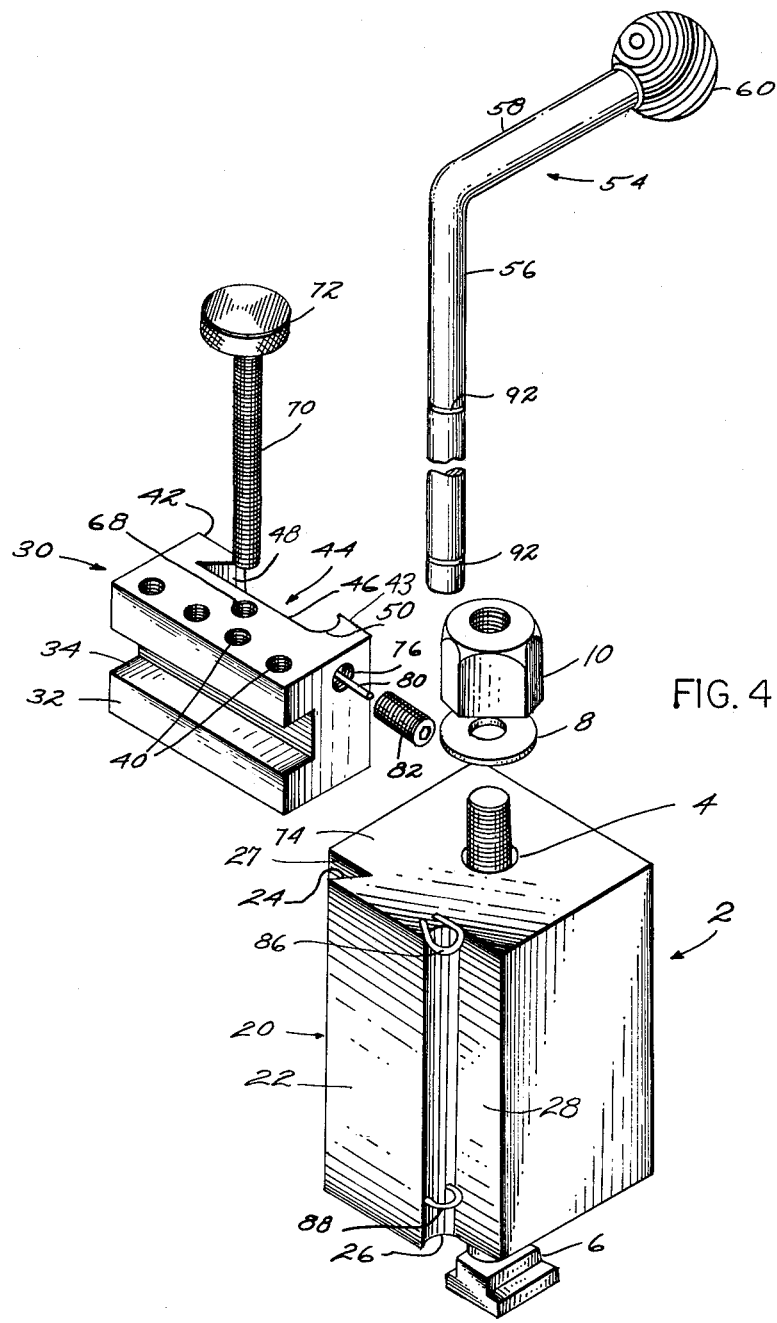
FIG. 4 is an exploded view of the unit of FIG. 1.

The illustrated tool block comprises a base identified generally at 2 having a central bore 4 adapted to accommodate a standard T-bolt 6 which is held in place by means of a washer 8 and a standard nut 10. The T-bolt 6 is adapted to fit in a mating T-shaped slot 12 formed in the cross slide 14 of a lathe. Of course, it is not essential that T-bolt 6 be used to attach the base 2 to the cross slide of the lathe. Alternatively, the bolt or some substitute adaptor may be used to attach the base 2 to the tool mount of some other machine, such as a standard screw machine.

The base 2 is generally of rectangular cross section, but it has on one face thereof a male dovetail identified generally at 20 which comprises a broad front surface 22 extending between two side surfaces 24 and 26 which terminate at flat front bearing surfaces 27 and 28 respectively. Side surface 24 is flat and at an acute angle to front surface 22. The opposite side surface 26 is concave with a semicylindrical curvature. Dovetail 20 extends for the entire vertical length of the base 2.

The base 2 functions to slidably support a tool holder identified generally at 30. This tool holder is formed from a solid metal block of generally rectangular cross section and has a front surface 32 provided with a horizontal U-shaped slot 34 which is used to accommodate a tool bit identified in phantom at 36 in FIG. 1. Any suitable type of cutting tool bit may be mounted in slot 34. The tool bit is retained in the slot 34 by means of a plurality of set screws (not shown) which are screwed into tapped holes 40 formed in the block 30. The rear face of tool holder 30 is divided into two bearing surfaces 42 and 43 by a female dovetail identified generally at 44. This dovetail is defined by a broad, flat surface 46 and two side surfaces 48 and 50. Side surface 48 is flat while side surface 50 is convex with a constant radius of curvature. Side surface 48 makes the same angle with surface 46 as side surface 24 does with surface 22. Side surface 48 has a slightly greater width than side surface 24, and broad surface 46 has a slightly greater width than the corresponding broad surface 22 of dovetail 20. The curved surface 50 has the same radius of curvature as the curved surface 26. However, whereas curved surface 26 is tangent to front surface 22, curved surface 50 is set back from bearing surface 43 by a small amount. Thus, when the two dovetails are fitted together so that bearing surfaces 27 and 28 lightly abut bearing surfaces 42 and 43, the broad surfaces 22 and 46 will be clear of each other. Moreover, the centers of curvature of surfaces 26 and 50 will be eccentric, as shown in FIG. 3 where the dots 26a and 50a represent the centers of curvature of surfaces 26 and 50 respectively. The actual spacing between front surfaces 22 and 46 and the actual spacing between the centers of curvature of curved surfaces 26 and 50 are exaggerated slightly in FIG. 3 so as to facilitate comprehension of the invention. Mating of the two dovetails results in an out-of-round, open-ended passageway 52 being defined by curved surfaces 26 and 50. As used herein, the term "out-of-round" means non-circular or eccentric. In this case, the passageway 52 has a generally elliptical cross-section wherein the shortest diametrical traverse is along a line running approximately at right angles to front surfaces 22 and 46 and the longest diametrical traverse is along a line extending approximately parallel to surfaces 22 and 46.

Cooperating with the tool holder 30 and the base 2 is a control or lock rod identified generally at 54 which is formed of circular stock bent at right angles so as to form a first shaft portion 56 and a second handle portion 58 provided with a knob handle 60. The shaft portion 56 is made out-of-round or eccentric. It may be made out-of-round in a variety of ways, preferably by turning it down on a lathe using an off-center chuck. The turned portion of the rod has a radius of curvature greater than the original radius of the rod. The extent of turning is exaggerated slightly in FIG. 3 where the turned down portion is shown at 62. The diameter of the stock from which lock rod 54 is made is less than twice the radius of curvature of the surfaces 26 and 50 by an amount such that without turning it down it would fit in passageway 52 only if the centers of curvature of surfaces 26 and 50 were coaxial. Therefore, since passageway 52 is not circular, the lock rod must be out-of-round in order to fit easily in the passageway. However, even then, the rod 54 will fit in passageway 52 only if it is oriented with its largest diameter disposed generally parallel to surfaces 22 and 46. When so inserted, the tool holder 30 will be free to move relative to base 2. However, if the lock rod 54 is rotated counterclockwise (as viewed in FIG. 3), it will act as a cam on curved surfaces 26 and 50, forcing them away from each other in the general direction of broken line F so as to lock toolholder 30 to base 2. The separating force exerted by the lock rod on curved surfaces 26 and 50 may be considered to have two vector components, one parallel and the other normal to surfaces 22 and 46. This separating force will bring together surfaces 27 and 42, 24 and 48, and 28 and 43. In operation, the lock rod is rotated until the aforesaid contacting surfaces are compressed tightly. This compression and the displacement of metal resulting therefrom not only causes rod 54 to lock the tool holder 30 to base 2, preventing it from moving up or down or forwardly or rearwardly or laterally, but also locks the rod so that it will remain in locking position until force is applied to turn it back to its unlocking position. In practice, secure locking takes place when the lock rod is substantially in the solid-line position shown in FIG. 3.

With the foregoing construction, it is an easy matter to position the tool bit 36 at any desired height within the limits established by the vertical dimensions of base 2 and tool holder 30. When it becomes necessary to shift the elevation of the tool bit, it is a simple matter to turn the lock rod 54 to unlocking position (clockwise from the locked position shown in FIG. 3), raise or lower the tool holder to the desired position, and thereafter to turn the lock rod back to locking position. The tool holder will then remain in its new position until the lock rod is again released.

It is also an easy matter to remove the tool holder. Once the lock rod 54 has been turned to unlocked position, the tool holder may be lifted or lowered off of base 2. This is advantageous in that it eliminates the need for removing the tool bit from holder 30 when it is desired to change to a new tool bit. Instead, the tool bit and holder may be removed as a unit and replaced by another unit consisting of a new holder and a new bit. To further facilitate this latter manner of use, means may be provided to assure that when a tool holder is slipped onto the base it will automatically assume the same position that is occupied when used previously. This is accomplished in the instant case by providing a tapped hole 68 in the tool holder 30 just in front of dovetail 44. Received in this tapped hole 68 is an adjustable stop screw 70 having an enlarged head 72. The diameter of the head is sufficient to allow it to overhang the top surface 74 of the base 2 when the tool holder is in place. At the initial setting, the tool holder is locked at the desired height and then screw 70 is turned down until its head 72 engages base 2. Thereafter, whenever the tool holder 30 is remounted on base 2, it will always drop to the same position unless screw 70 has been turned to a new setting. To assure that the screw 70 will not turn from a given setting under shock or vibration, it has been found feasible to provide a tapped hole 76 at one end of the tool holder 30. This tapped hole 76 extends into the tool holder far enough to intersect the tapped hole 68. In practice, a pin 80 is inserted in the tapped hole 76 and is forced into engagement with lock screw 70 by a set screw 82. Pin 80 is made of a metal which is softer than screw 70. This assures that it will not injure the threads of screw 70. Set screw 82 is sized to make a tight fit with the threads of hole 76 so that it will not come loose by itself. As a consequence, screw 70 will be prevented from rotating until such time as pin 80 is relieved of the pressure exerted by the set screw 82.

Since the tool holder 30 is full removable from the base 2, means must be provided for holding the lock rod 54 in place in the absence of the tool holder 30. In the instant case, the lock rod is held in place by two retaining elements 86 and 88 which are U-shaped lengths of sturdy metal wire whose ends are force-fitted into small holes formed in base 2. These elements encircle the lock rod. The latter is formed with grooves 92 which permit the retaining elements to be flush with the surface of the rod so as not to obstruct movement of the tool holder 30.

In practice, it is also preferred to file down the surface 94 (see FIG. 3) which results from the fact that curved surface 50 is not tangent to rear surface 48. Filing down surface 94 has the advantage of reducing interference with the lock rod without affecting the desired cam action. The sharp edges at the intersections of surfaces 42 and 48, 22 and 24, and 22 and 26 also are filed to avoid interference of the mating parts and eliminate points of physical weakness.

It is believed to be apparent from the foregoing description that the illustrated device is simple and easy to construct and provides a reliable locking action. This locking action is due in great part to the relatively large amount of bearing surface afforded by the mating dovetails. Moreover, the device permits the tool holder to be shifted from one position to another with exceptional ease and has the further advantage that the tool holder can be removed and restored with a minimum of adjustment.

The base 2 and the tool holder 30, as well as the lock rod 54, may be made of various materials, steel being preferred. They may also be made in various sizes so as to accommodate larger or smaller tool holders. They also may be made so as to accept more than one T-bolt. Other means also may be used in place of or in conjunction with the T-bolt to secure the base in place.

While the above-described design is preferred, the configurations and dimensions of the lock rod and the surfaces 26 and 50 may be varied without departing from the principles of the present invention. Thus, the surfaces 26 and 50 may be curved but disposed so that the camming action is primarily lateral; alternatively, the surfaces even may be planar, as, for example, like the other side surfaces 24 and 48. The important thing is that a passageway be formed between the two surfaces to accommodate a rotatable lock rod which, by virtue of its cross-sectional configuration, is capable of exerting a camming action on the surfaces sufficient to lock the two dovetails together. It is contemplated also that the lock rod 54 could be made in two pieces, i.e., with a removable handle or wrench, to reduce obstruction.

Obviously, many other modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. A tool block comprising a base and a tool holder having cooperating dovetail sections with confronting oppositely curved surfaces, and rotatable means interposed between and engaging said confronting surfaces of said sections for forcing said sections into tight engagement with each other, whereby to prevent relative movement between said base and tool holder, and said rotatable means is an elongate rod having a curved outer surface defining an out-of-round cross section.

2. A tool block for a machine comprising a base adapted to be attached to a supporting structure, said base having a first modified dovetail comprising a first flat surface connecting a second flat obliquely extending side surface and a third curved side surface, a tool holder having a second modified dovetail, said second dovetail comprising a fourth flat surface connecting a fifth flat obliquely extending side surface and a sixth curved side surface, said tool holder disposed so that said dovetails are in mating relation with said curved surfaces defining an elongated passageway having an out-of-round cross section, and a lock rod disposed in said passageway, said lock rod also having an out-of-round cross section and rotatable between a first position wherein said tool holder is free to move relative to said base and a second position wherein it forces said second and fifth surfaces together so that said tool holder is locked against movement relative to said base.

3. A tool block as defined by claim 2 wherein said first and second dovetails are male and female respectively.

4. A tool block as defined by claim 2 further including means for preventing axial movement of said lock rod.

5. A tool block as defined by claim 2 further including adjustable stop means on said tool holder engageable with the top of said base to determine the position of said tool holder on said base.

6. A tool block comprising a base and a tool holder slidably mounted on said base, said base and tool holder having cooperating dovetail sections, said sections each having a curved surface along a corresponding side thereof, said curved surfaces together defining an elongate passageway extending parallel to the longitudinal axes of said sections, and an elongate eccentric lock rod rotatably disposed in said passageway parallel to said axes, said lock rod operable when rotated to lock said tool holder to said base by a camming action exerted directly on said curved surfaces.

7. A tool block comprising a base and a tool holder slidably mounted on said base, said base and tool holder having cooperating dovetail sections, said section each having a curved surface along a corresponding side thereof, said curved surfaces together defining an elongate passageway of out-of-round cross-section extending parallel to the longitudinal axes of said base and said tool holder, and locking means rotatably disposed in said passageway parallel to said axes and operable when rotated to lock said tool holder to said base by a camming action exerted directly on said curved surfaces.

References Cited by the Examiner

UNITED STATES PATENTS 2,616,326 11/52 Bergstrom.
2,972,272 2/61 Sirola.

FOREIGN PATENTS 213,193 1/61 Austria.
247,275 12/47 Switzerland.
317,975 1/57 Switzerland.

WILLIAM W. DYER, JR., *Primary Examiner.*